US007562554B2

(12) United States Patent
Yoo et al.

(10) Patent No.: US 7,562,554 B2
(45) Date of Patent: Jul. 21, 2009

(54) METHOD FOR CALIBRATING INDEPENDENT METERING VALVES

(75) Inventors: Benjamin Yoo, Morton, IL (US); Eric Charles Hughes, Metamora, IL (US); Rick Dean Vance, Washington, IL (US)

(73) Assignees: Caterpillar Inc., Peoria, IL (US); Shin Caterpillar Mistubishi Ltd (JP)

( * ) Notice: Subject to any disclaimer, the term of this patent is extended or adjusted under 35 U.S.C. 154(b) by 181 days.

(21) Appl. No.: 11/513,105

(22) Filed: Aug. 31, 2006

(65) Prior Publication Data

US 2008/0053191 A1 Mar. 6, 2008

(51) Int. Cl.
*G01M 3/04* (2006.01)

(52) U.S. Cl. ........................................................ 73/1.72

(58) Field of Classification Search .................. 73/1.72, 73/49.8, 1, 71, 865.9, 37
See application file for complete search history.

(56) References Cited

U.S. PATENT DOCUMENTS

| | | | | |
|---|---|---|---|---|
| 5,082,097 | A | 1/1992 | Goeckner et al. | 477/80 |
| 5,224,577 | A | 7/1993 | Falck et al. | 74/336 R |
| 5,762,475 | A | 6/1998 | Maddock et al. | 417/29 |
| 5,813,226 | A | 9/1998 | Krone et al. | 60/327 |
| 5,853,076 | A | 12/1998 | McKee et al. | 192/87.14 |
| 5,902,344 | A | 5/1999 | Eike et al. | 701/67 |
| 6,205,875 | B1 | 3/2001 | Eike et al. | 74/335 |
| 6,357,276 | B1 | 3/2002 | Koehler et al. | 73/1.01 |
| 6,397,655 | B1 | 6/2002 | Stephenson | 73/1.72 |
| 6,692,088 | B1 | 2/2004 | Zheng | 303/113.1 |
| 6,889,121 | B1 | 5/2005 | Shahroudi et al. | 700/282 |
| 6,895,798 | B2 | 5/2005 | Sosnowski | 73/1.57 |
| 2007/0234340 | A1 * | 10/2007 | Strosser et al. | 717/173 |

FOREIGN PATENT DOCUMENTS

| | | | |
|---|---|---|---|
| EP | 1 002 454 | A1 | 5/2000 |
| EP | 1 020 648 | A1 | 7/2000 |
| EP | 1 143 152 | A2 | 10/2001 |
| GB | 2 332 023 | A | 6/1999 |

OTHER PUBLICATIONS

PCT International Search Report: PCT/US2007/017655; Filing Date: Aug. 8, 2007; Applicant: Caterpillar Inc. & SCM; Applicant's Ref No.: 06-122.

* cited by examiner

*Primary Examiner*—Hezron E. Williams
*Assistant Examiner*—Tamiko D Bellamy
(74) *Attorney, Agent, or Firm*—Finnegan, Henderson, Farabow, Garrett & Dunner

(57) ABSTRACT

A method for calibrating a valve having a valve element movable between a flow blocking position and a flow passing position includes pressurizing fluid directed to the valve, increasing a current directed to the valve for controlling a position of the valve element, and sensing a pressure of the fluid. The method for calibrating the valve also includes determining if a time-derivative of the sensed fluid pressure is greater than a predetermined threshold over a predetermined period of time, and determining a cracking point current command directed to the valve. The cracking point current command is directed to the valve when the time-derivative of the sensed fluid pressure is greater than the predetermined threshold.

24 Claims, 5 Drawing Sheets

METHOD FOR CALIBRATING INDEPENDENT METERING VALVES

TECHNICAL FIELD

The present disclosure relates generally to a method for calibrating valves, and more particularly, to a method for calibrating independent metering valves.

BACKGROUND

Machines such as, for example, dozers, loaders, excavators, motor graders, and other types of heavy machinery use one or more hydraulic actuators to accomplish a variety of tasks. These actuators are fluidly connected to a pump on the machine that provides pressurized fluid to chambers within the actuators. A valve arrangement is typically fluidly connected between the pump and at least one of the actuators to control a flow rate and direction of pressurized fluid to and from the chambers of the actuator.

The valve arrangement may include independent metering valves (IMVs) that are independently actuated to allow pressurized hydraulic fluid to flow from the pump to the actuator chambers. The amount of the hydraulic flow to each actuator chamber can be controlled by changing the displacement of a valve spool in each IMV. Each valve spool has a series of metering slots which control flows of the hydraulic fluid in the valve arrangement, including a flow from the pump to the actuator and a flow from the actuator to a tank. When the actuator is a hydraulic cylinder, these flows are commonly referred to as pump-to-cylinder flow and cylinder-to-tank, respectively.

The manufacture and assembly of the IMVs may affect the performance of the valve components such that each IMV may perform differently from the others. As a result, the valve components may not operate predictably and the performance of the hydraulic actuator may be degraded.

One method of controlling flow through a valve arrangement fluidly connected between a pump and an actuator is described in U.S. Pat. No. 6,397,655 ("the '655 patent") issued to Stephenson. The '655 patent describes a method of calibrating an inlet valve or an outlet valve connected to an actuator chamber. The inlet valve controls the amount of flow supplied to the actuator chamber, and the outlet valve controls the amount of flow exiting the actuator chamber. To calibrate the inlet valve, the outlet valve is closed while current to actuate the inlet valve increases, thereby increasing the pressure in the actuator chamber. A valve opening current level for the inlet valve is determined when a rate of increase in pressure in the actuator chamber exceeds a predetermined threshold. To calibrate the outlet valve, the inlet valve is opened so that the pressure in the actuator chamber increases. The inlet valve is then closed, and the current to actuate the outlet valve is increased. A valve opening current level for the outlet valve is determined when a magnitude of the rate of decrease in pressure in the actuator chamber exceeds a predetermined threshold. The calibration ensures that the difference between the valve opening current level for the inlet or outlet valve and an initial current level for the respective valve differs by at least a desired margin.

The calibration method of the '655 patent determines a predefined initial current level that is initially applied to the valve. This initial current level is a desired amount less than the current level at which the valve begins to open. The initial current level supplied to the inlet or outlet valve is adjusted only when there exists a difference between the measured valve opening current and the initial current level. The '655 patent also requires pressure sensors at the respective cylinder ports, which requires a sensor at each cylinder port. This increases the number of sensors, thereby increasing the complexity of the calibration process. Furthermore, the '655 patent measures the valve opening current level when the rate of pressure change reaches a predetermined threshold, but does not determine whether the rate of pressure change remains above the predetermined threshold for a predetermined period of time. Therefore, the calibration method of the '655 patent may determine the valve opening current level prematurely if there is an error in measuring the rate of pressure change due to signal noise or leakage through the inlet or outlet valve.

The disclosed system is directed to overcoming one or more of the problems set forth above.

SUMMARY OF THE INVENTION

In one aspect, the present disclosure is directed to a method for calibrating a valve having a valve element movable between a flow blocking position and a flow passing position. The method includes pressurizing fluid directed to the valve, increasing a current directed to the valve for controlling a position of the valve element, and sensing a pressure of the fluid. The method for calibrating the valve also includes determining if a time-derivative of the sensed fluid pressure is greater than a predetermined threshold over a predetermined period of time, and determining a cracking point current command directed to the valve. The cracking point current command is directed to the valve when the time-derivative of the sensed fluid pressure is greater than the predetermined threshold.

In another aspect, the present disclosure is directed to a system for calibrating a valve having a valve element movable between a flow blocking position and a flow passing position. The system includes a source configured to pressurize a fluid, a pressure sensor configured to sense a pressure of the fluid at an outlet of the source, and a controller connected to the pressure sensor. The controller is configured to increase a current directed to the valve for controlling a position of the valve element and receive a sensed fluid pressure from the pressure sensor. The controller is also configured to determine if the valve is at the flow passing position based on the measured fluid pressure at the outlet of the source and determine a cracking point current command directed to the valve when the valve is at the flow passing position.

In another aspect, the present disclosure is directed to a method for determining an actual current command to control a valve. The valve includes a valve element movable between a flow blocking position and a flow passing position. The method includes determining a nominal current command based on a desired position of the valve element, determining a calibration offset current command based on a calibration of the valve, and determining the actual current command by summing the nominal current command and the calibration offset current command.

DETAILED DESCRIPTION

Figure 1:
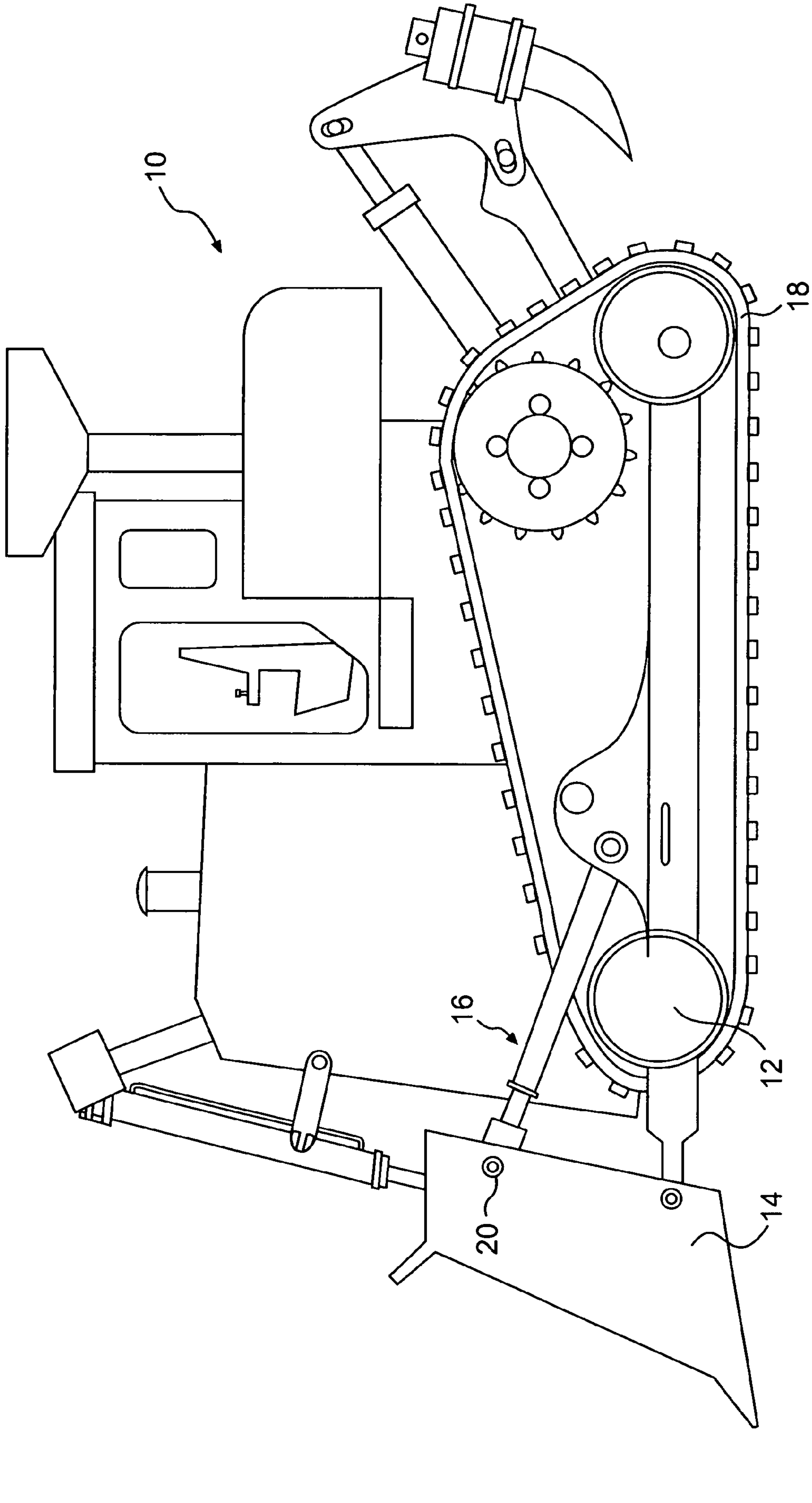
FIG. 1 is a side-view diagrammatic illustration of a machine according to an exemplary disclosed embodiment.

FIG. 1 illustrates an exemplary machine 10. Machine 10 may be a fixed or mobile machine that performs some type of operation associated with an industry such as mining, construction, farming, or any other industry known in the art. For example, machine 10 may be an earth moving machine such as a dozer, a loader, a backhoe, an excavator, a motor grader, a dump truck, or any other earth moving machine. Machine 10 may also include a generator set, a pump, a marine vessel, or any other suitable operation-performing machine. Machine 10 may include a frame 12, at least one implement 14, and a hydraulic cylinder 16 or other fluid actuator connecting implement 14 to frame 12. It is contemplated that hydraulic cylinder 16 may be omitted, if desired, and a hydraulic motor included.

Frame 12 may include any structural unit that supports movement of machine 10. Frame 12 may be, for example, a stationary base frame connecting a power source (not shown) to a traction device 18, a movable frame member of a linkage system, or any other frame known in the art.

Implement 14 may include any device used in the performance of a task. For example, implement 14 may include a blade, a bucket, a shovel, a ripper, a dump bed, a propelling device, or any other task-performing device known in the art. Implement 14 may be connected to frame 12 via a direct pivot 20, via a linkage system with hydraulic cylinder 16 forming one member in the linkage system, or in any other appropriate manner. Implement 14 may be configured to pivot, rotate, slide, swing, or move relative to frame 12 in any other manner known in the art.

Figure 2:
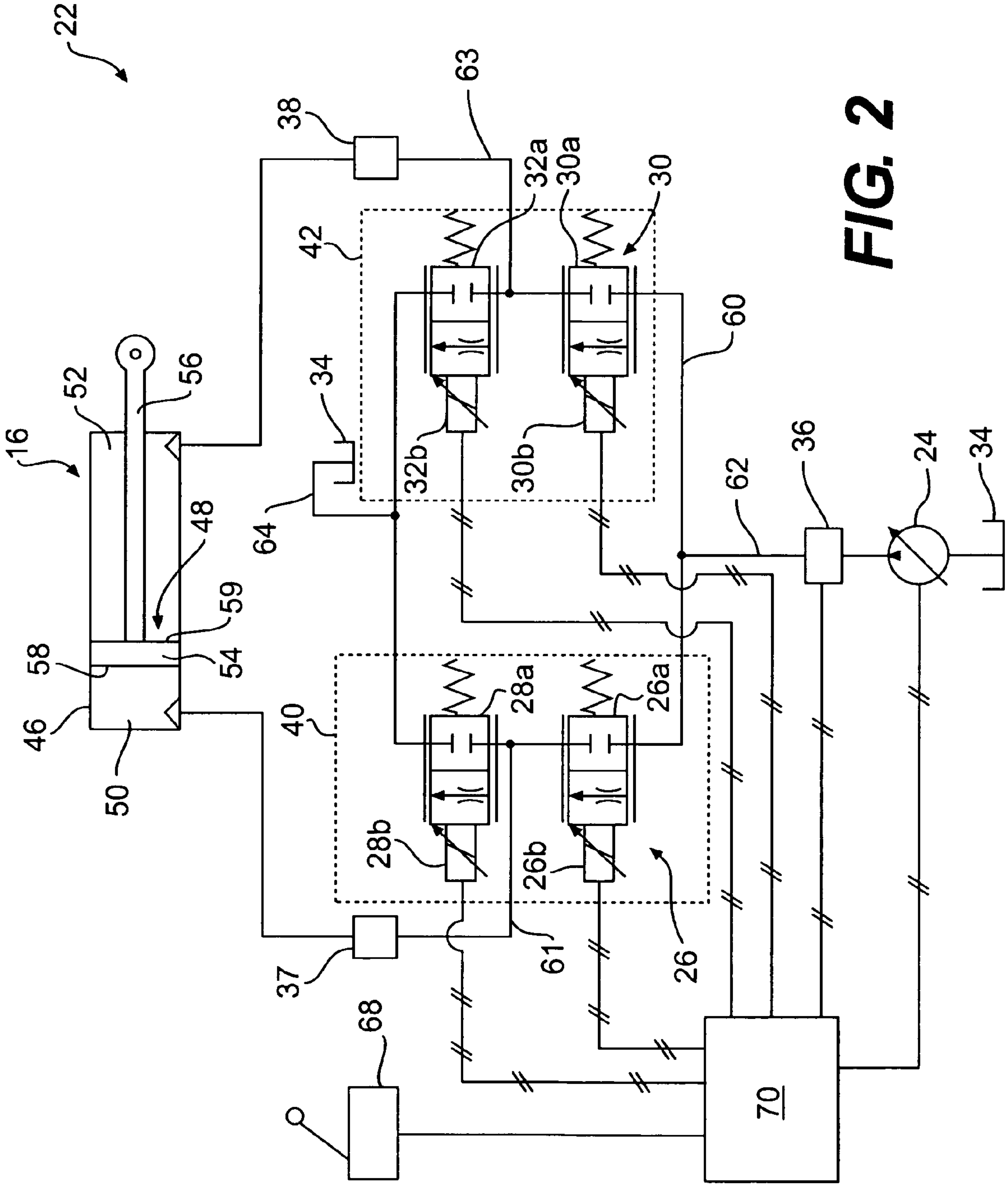
FIG. 2 is a schematic illustration of an exemplary disclosed hydraulic system according to an exemplary disclosed embodiment.

As illustrated in FIG. 2, hydraulic cylinder 16 may be one of various components within a hydraulic system 22 that cooperate to move implement 14. Hydraulic system 22 may include a source 24 of pressurized fluid, a head-end supply valve 26, a head-end drain valve 28, a rod-end supply valve 30, a rod-end drain valve 32, a tank 34, and one or more pressure sensors 36, 37, 38. Hydraulic system 22 may further include a controller 70 in communication with the fluid components of hydraulic system 22. It is contemplated that hydraulic system 22 may include additional and/or different components such as, for example, a pressure sensor, a temperature sensor, a position sensor, a controller, an accumulator, and other components known in the art. Though the exemplary hydraulic system 22 includes hydraulic cylinder 16 in fluid communication with valves 26, 28, 30, 32 to be calibrated, the valves to be calibrated are not limited to valves controlling flow to and from a hydraulic cylinder. One or more valves, such as valves 26, 28, 30, 32, may be used to control other various types of hydraulic flows, such as a flow to a motor circuit, e.g., a swing circuit on a hydraulic excavator, etc.

Each of head-end and rod-end supply and drain valves 26, 28, 30, 32 may be an independent metering valve (IMV) that is independently operable to be in fluid communication with source 24, hydraulic cylinder 16, tank 34, and/or any other device present in hydraulic system 22. Each of head-end and rod-end supply and drain valves 26, 28, 30, 32 may be independently metered to control hydraulic flow in multiple hydraulic paths. Controller 70 controls each of the independently operable valves 26, 28, 30, 32.

Each of head-end and rod-end supply and drain valves 26, 28, 30, 32 includes a valve spool 26*a*, 28*a*, 30*a*, 32*a* and an actuator 26*b*, 28*b*, 30*b*, 32*b* to move respective valve spool 26*a*, 28*a*, 30*a*, 32*a* to a desired position to thereby control the hydraulic flow through valve 26, 28, 30, 32. The displacement of each valve spool 26*a*, 28*a*, 30*a*, 32*a* changes the flow rate of the hydraulic fluid through the associated valve 26, 28, 30, 32. Actuator 26*b*, 28*b*, 30*b*, 32*b* may be a solenoid actuator or any other actuator known to those skilled in the art.

Hydraulic cylinder 16 may include a tube 46 and a piston assembly 48 disposed within tube 46. One of tube 46 and piston assembly 48 may be pivotally connected to frame 12, while the other of tube 46 and piston assembly 48 may be pivotally connected to implement 14. It is contemplated that tube 46 and/or piston assembly 48 may alternately be fixedly connected to either frame 12 or implement 14. Hydraulic cylinder 16 may include a first chamber 50 and a second chamber 52 separated by piston assembly 48. In the exemplary embodiment shown in FIG. 2, first chamber 50 is located closer to a head end of hydraulic cylinder 16, and second chamber 52 is located closer to a rod end of hydraulic cylinder 16. The first and second chambers 50, 52 may be selectively supplied with a fluid pressurized by source 24 and fluidly connected with tank 34 to cause piston assembly 48 to displace within tube 46, thereby changing the effective length of hydraulic cylinder 16. The expansion and retraction of hydraulic cylinder 16 may function to assist in moving implement 14.

Piston assembly 48 may include a piston 54 axially aligned with and disposed within tube 46, and a piston rod 56 connectable to one of frame 12 and implement 14 (referring to FIG. 1). Piston 54 may include a first hydraulic surface 58 and a second hydraulic surface 59 opposite first hydraulic surface 58. An imbalance of force caused by fluid pressure on first and second hydraulic surfaces 58, 59 may result in movement of piston assembly 48 within tube 46. For example, a force on first hydraulic surface 58 being greater than a force on second hydraulic surface 59 may cause piston assembly 48 to displace to increase the effective length of hydraulic cylinder 16. Similarly, when a force on second hydraulic surface 59 is greater than a force on first hydraulic surface 58, piston assembly 48 will retract within tube 46 to decrease the effective length of hydraulic cylinder 16. A sealing member (not shown), such as an o-ring, may be connected to piston 54 to restrict a flow of fluid between an internal wall of tube 46 and an outer cylindrical surface of piston 54.

Source 24 may be configured to produce a flow of pressurized fluid and may include a pump such as, for example, a variable displacement pump, a fixed displacement pump, or any other source of pressurized fluid known in the art. Source 24 may be drivably connected to a power source (not shown) of machine 10 by, for example, a countershaft (not shown), a belt (not shown), an electrical circuit (not shown), or in any other suitable manner. Source 24 may be dedicated to supplying pressurized fluid only to hydraulic system 22, or alternately may supply pressurized fluid to additional hydraulic systems (not shown) within machine 10.

A head-end valve section 40 includes head-end supply valve 26 and head-end drain valve 28. Head-end supply valve 26 may be disposed between source 24 and first chamber 50 and configured to regulate a flow of pressurized fluid to first chamber 50. Head-end supply valve 26 may include a two-position spring biased valve mechanism that is actuated by solenoid 26*b* and configured to move valve spool 26*a* between a first (open) position at which fluid is allowed to flow into first chamber 50 and a second (closed) position at which fluid flow is blocked from first chamber 50. Head-end drain valve 28 may be disposed between first chamber 50 and tank 34 and configured to regulate a flow of pressurized fluid from first chamber 50 to tank 34. Head-end drain valve 28 may include a two-position spring biased valve mechanism that is actuated by solenoid 28*b* and configured to move valve spool 28*a* between a first (open) position at which fluid is allowed to flow from first chamber 50 and a second (closed) position at which fluid is blocked from flowing from first chamber 50.

A rod-end valve section 42 includes rod-end supply valve 30 and rod-end drain valve 32. Rod-end supply valve 30 may be disposed between source 24 and second chamber 52 and configured to regulate a flow of pressurized fluid to second chamber 52. Rod-end supply valve 30 may include a two-position spring biased valve mechanism that is actuated by solenoid 30*b* and configured to move valve spool 30*a* between a first (open) position at which fluid is allowed to flow into second chamber 52 and a second (closed) position at which fluid is blocked from second chamber 52. Rod-end drain valve 32 may be disposed between second chamber 52 and tank 34 and configured to regulate a flow of pressurized fluid from second chamber 52 to tank 34. Rod-end drain valve 32 may include a two-position spring biased valve mechanism that is actuated by solenoid 32*b* and configured to move valve spool 32*a* between a first (open) position at which fluid is allowed to flow from second chamber 52 and a second (closed) position at which fluid is blocked from flowing from second chamber 52.

One or more head-end and rod-end supply and drain valves 26, 28, 30, 32 may include additional or different valve mechanisms such as, for example, a proportional valve element or any other valve mechanism known in the art. Furthermore, one or more head-end and rod-end supply and drain valves 26, 28, 30, 32 may alternately be hydraulically actuated, mechanically actuated, pneumatically actuated, or actuated in any other suitable manner. Hydraulic system 22 may include additional components to control fluid pressures and/or flows within hydraulic system 22 such as relief valves, makeup valves, shuttle valves, check valves, hydro-mechanically actuated proportional control valves, etc. For example, a bypass valve (not shown) may be provided for adjusting the pressure of the fluid. The bypass valve may allow flow from pump 24 to bypass into tank 34.

Head-end and rod-end supply and drain valves 26, 28, 30, 32 may be fluidly interconnected. In particular, head-end and rod-end supply valves 26, 30 may be connected in parallel to an upstream fluid passageway 60. Upstream common fluid passageway 60 may be connected to receive pressurized fluid from pump 24 via a supply passageway 62. Head-end and rod-end drain valves 28, 32 may be connected in parallel to a drain passageway 64. Head-end supply and return valves 26, 28 may be connected in parallel to a first chamber fluid passageway 61. Rod-end supply and return valves 30, 32 may be connected in parallel to a second chamber fluid passageway 63.

Tank 34 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 34. It is also contemplated that hydraulic system 22 may be connected to multiple separate fluid tanks.

Hydraulic system 22 also includes one or more pressure sensors 36, 37, 38. For example, pressure sensor 36 monitoring an output pressure P of pump 24 may be provided in supply fluid passageway 62. When the fluid passes from pump 24 to hydraulic system 22, pressure sensor 36 in supply fluid passageway 62 monitors the output pressure P of the fluid supplied by pump 24 entering hydraulic system 22, and transmits an output signal reflecting the measured pressure to controller 70. The pressure sensor(s) 36, 37, 38 can be placed at any location suitable to determine a desired pressure of fluid supplied by pump 24. The exemplary calibration method described below determines output pressure P of pump 24 using pressure sensor 36. It is understood, however, that the calibration method may determine pressure P using pressure sensor(s) at other locations in hydraulic system 22, such as, for example, pressure sensors 37, 38. As shown in FIG. 2, pressure sensor 37 monitors a pressure associated with first chamber 50 of hydraulic cylinder 16 and pressure sensor 38 monitors a pressure associated with second chamber 52 of hydraulic cylinder 16. One skilled in the art will appreciate that pressure sensor 36, 37, 38 may include any pressure sensor assembly capable of ascertaining a pressure of the fluid supplied by pump 24 and/or entering hydraulic system 22. Furthermore, the location(s) and number of pressure sensors 36, 37, 38 are not limited to the specific arrangement illustrated in FIG. 2.

Controller 70 may embody a single microprocessor or multiple microprocessors that include a means for controlling an operation of hydraulic system 22. Numerous commercially available microprocessors can be configured to perform the functions of controller 70. It should be appreciated that controller 70 could readily be embodied in a general machine microprocessor capable of controlling numerous machine functions. Controller 70 may include a memory, a secondary storage device, a processor, and any other components for running an application. Various other circuits may be associated with controller 70 such as power supply circuitry, signal conditioning circuitry, solenoid driver circuitry, and other types of circuitry. Controller 70 may be connected to at least one operator input device 68 that allows an operator to control the operation of one or more components of the hydraulic system 22 using one or more control devices known in the art, such as one or more pedals, switches, dials, paddles, joysticks, etc.

Controller 70 is electrically coupled to pressure sensors 36 and actuators 26*b*, 28*b*, 30*b*, 32*b* of the head-end and rod-end supply and drain valves 26, 28, 30, 32. Controller 70 receives pressure readings from pressure sensor 36 and may be configured to receive input from operator input device 68. Controller 70 sends one or more electrical command signals to actuators 26*b*, 28*b*, 30*b*, 32*b*. In response to the electrical command signal(s), one or more actuators 26*b*, 28*b*, 30*b*, 32*b* apply a varying force to controllably move one or more valve spools 26*a*, 28*a*, 30*a*, 32*a* to a desired displacement to control the hydraulic flow through the hydraulic system 22.

Hydraulic cylinder 16 may be movable by fluid pressure in response to an operator input using operator input device 68. Fluid may be pressurized by source 24 and directed to head-end and rod-end supply valves 26 and 30. In response to an operator input to either extend or retract piston assembly 48, one of head-end and rod-end supply valves 26 and 30 may move to the open position to direct the pressurized fluid to the appropriate one of first and second chambers 50, 52. Substantially simultaneously, one of head-end and rod-end drain valves 28, 32 may move to the open position to direct fluid from the appropriate one of the first and second chambers 50, 52 to tank 34 to create a pressure differential across piston 54 that causes piston assembly 48 to move. For example, if an extension of hydraulic cylinder 16 is requested, head-end supply valve 26 may move to the open position to direct pressurized fluid from source 24 to first chamber 50. Substantially simultaneous to the directing of pressurized fluid to first chamber 50, rod-end drain valve 32 may move to the open position to allow fluid from second chamber 52 to drain to tank 34. If a retraction of hydraulic cylinder 16 is requested, rod-end supply valve 30 may move to the open position to direct pressurized fluid from source 24 to second chamber 52. Substantially simultaneous to the directing of pressurized fluid to second chamber 52, head-end drain valve 28 may move to the open position to allow fluid from first chamber 50 to drain to tank 34.

Figure 3:
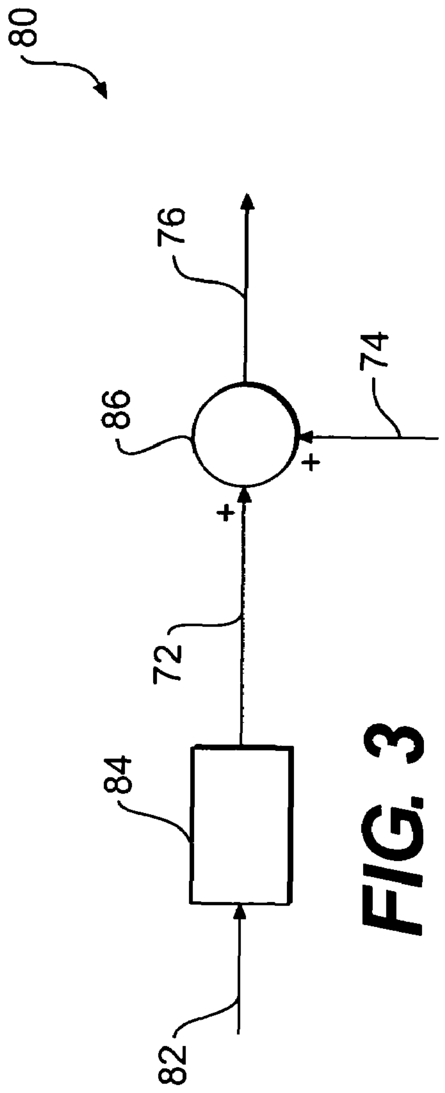
FIG. 3 is a schematic illustration of an exemplary current control system for controlling the valves of the hydraulic system of FIG. 2.

FIG. 3 illustrates an exemplary current control system 80 of controller 70 for controlling valves 26, 28, 30, 32. Current control system 80 receives a spool displacement command 82, which reflects a desired spool displacement, for the valve 26, 28, 30, 32. Spool displacement command 82 may be determined based on, for example, a desired amount of fluid to direct to or from one of the first and second chambers 50, 52 as described above.

Current control system 80 transmits spool displacement command 82 to an actuator transform 84. Actuator transform 84 creates a nominal (or desired) current command 72 based on spool displacement command 82. Current control system 80 then transmits nominal current command 72 to a modifier 86 that outputs an actual current command 76 based on nominal current command 72. In the exemplary embodiment shown in FIG. 3, modifier 86 determines actual current command 76 by summing nominal current command 72 and a calibration offset current command 74. Actual current command 76 is transmitted to the actuator 26*b*, 28*b*, 30*b*, 32*b* of the respective valve 26, 28, 30, 32.

Calibration offset current command 74 is determined for each valve 26, 28, 30, 32 by a calibration method as described below. The calibration of valves 26, 28, 30, 32 includes determining the point at which flow begins through the valve being calibrated, and this point is commonly referred to as the cracking point. Calibration of one or more valves 26, 28, 30, 32 may occur once or multiple times, e.g., after assembling hydraulic system 22, periodically at the work site, after certain events, etc. In the exemplary embodiment, calibration offset current command 74 is based on a current command from controller 70 at the cracking point that is determined during the calibration of valve 26, 28, 30, 32. In the exemplary embodiment, calibration offset current command 74 equals the cracking point current command, i.e., the current command at the cracking point, determined using the calibration method described below, minus the expected (or desired) current command at the cracking point. The expected current command at the cracking point is a predetermined current command that is expected to open respective valve 26, 28, 30, 32. It is understood, however, that the calibration offset current command 74 may also depend on other factors associated with valves 26, 28, 30, 32, etc.

Figure 4:
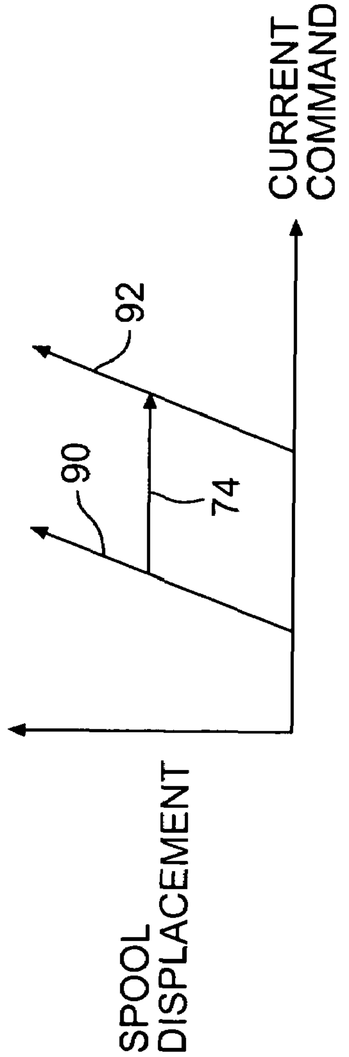
FIG. 4 is a graph illustrating a relationship between a displacement of a valve spool and nominal and actual current commands using the current control system of FIG. 3.

FIG. 4 illustrates an exemplary relationship between a displacement of one of the valve spools 26*a*, 28*a*, 30*a*, 32*a* and a current command from controller 70 to the associated actuator 26*b*, 28*b*, 30*b*, 32*b* determined using current control system 80 shown in FIG. 3. A nominal control curve 90 shows the valve spool displacement versus nominal current command 72. An actual control curve 92 shows the valve spool displacement versus actual current command 76. As shown in FIG. 4, the difference between the nominal control curve 90 (corresponding to nominal current command 72) and the actual control curve 92 (corresponding to actual current command 76) is calibration offset current command 74.

Figure 5A:
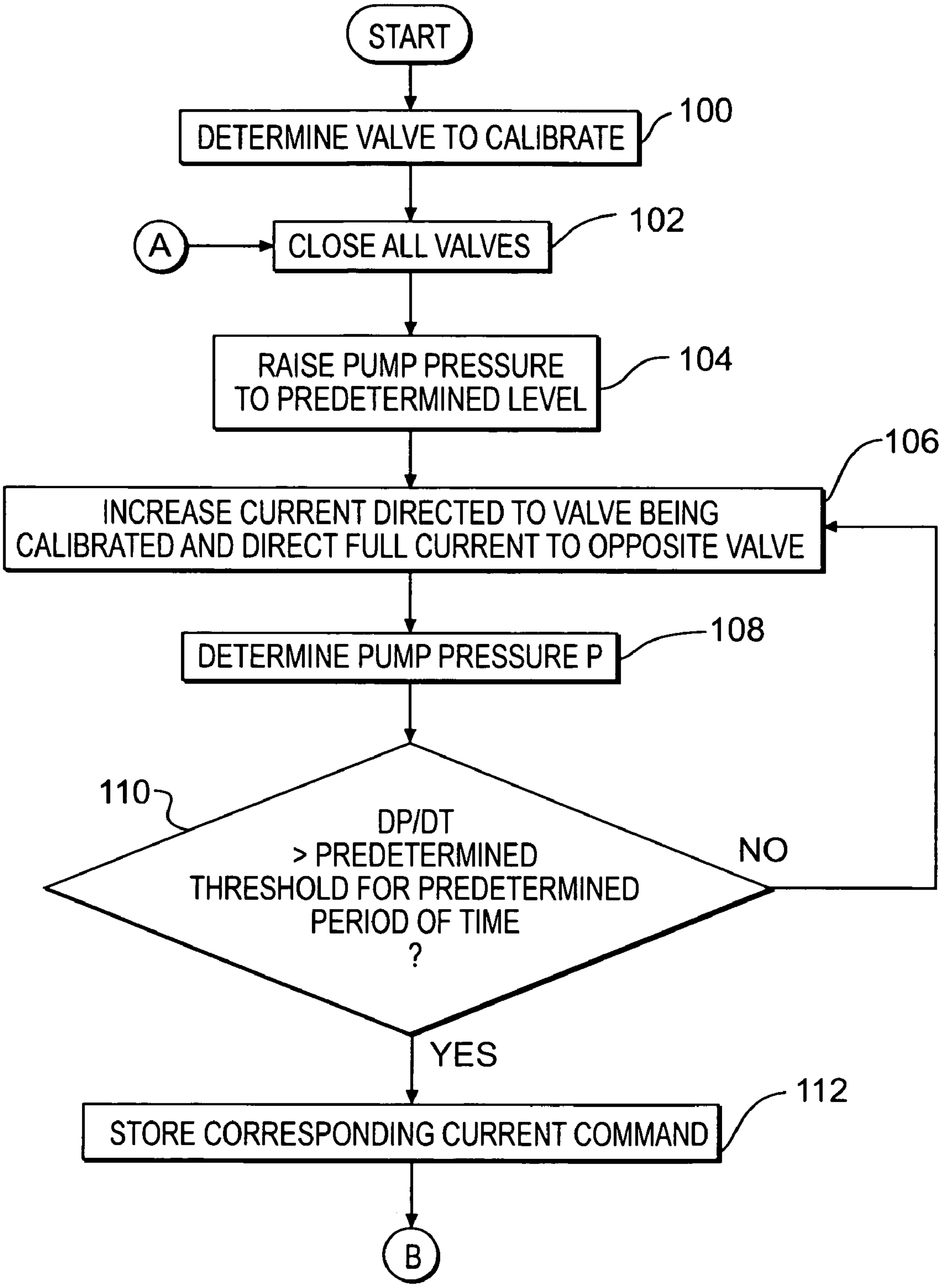
FIGS. 5A and 5B illustrate a flow chart of an exemplary disclosed method of calibrating the valves of the hydraulic system of FIG. 2.
Figure 5B:
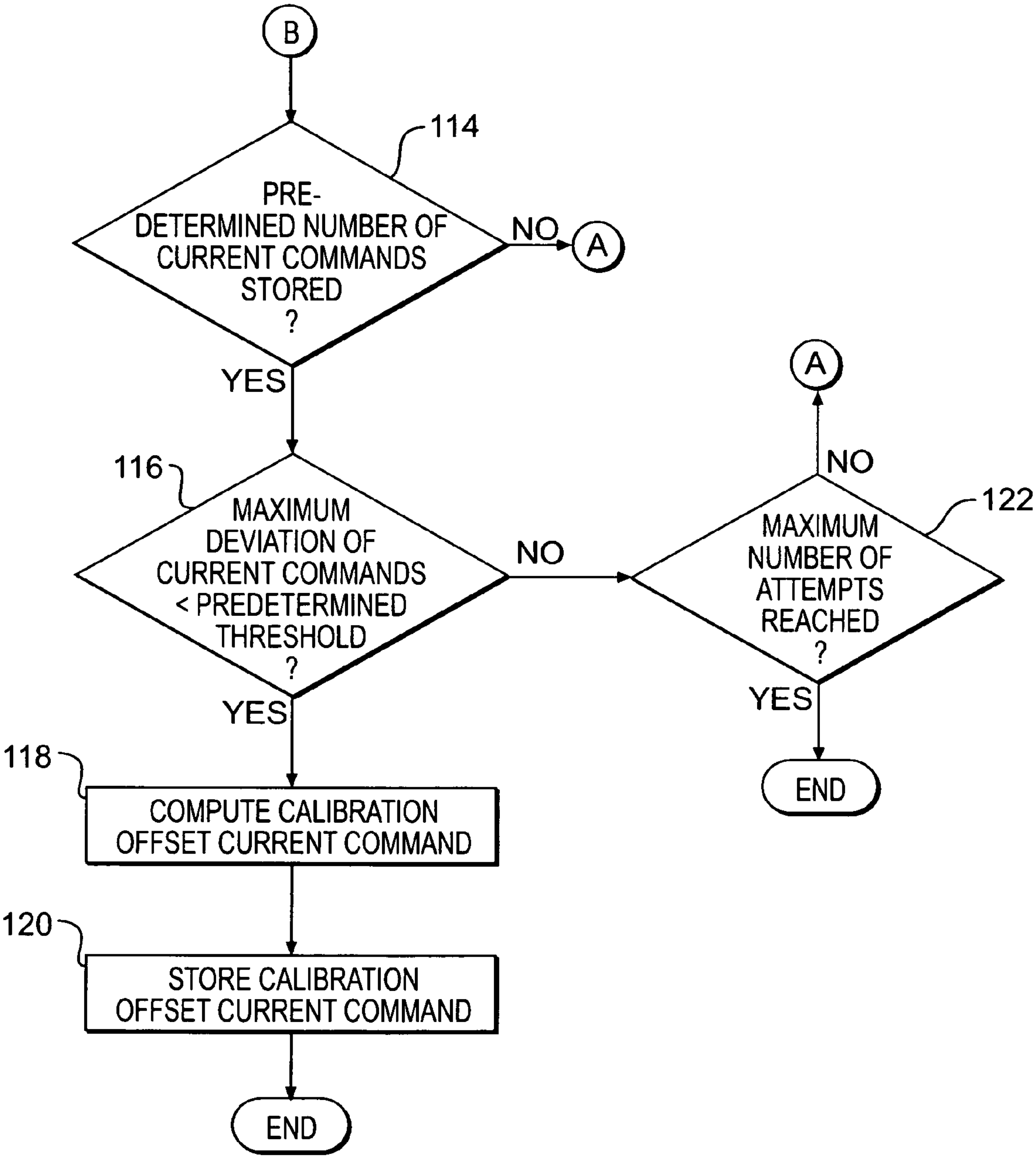

FIGS. 5A and 5B illustrate a flow chart showing an exemplary method of calibrating hydraulic system 22 by determining the cracking point current command consistent with certain disclosed embodiments. As shown in FIG. 5A, controller 70 may determine which valve 26, 28, 30, 32 to calibrate (step 100). Valve 26, 28, 30, 32 may be selected automatically by controller 70 or by the operator or other entity and information indicating the selection may be transmitted to controller 70. The following steps describe the calibration of head-end supply valve 26. However, it is understood that similar steps are also executed when calibrating head-end drain valve 28, rod-end supply valve 30, or rod-end drain valve 32.

Controller 70 may close all valves 26, 28, 30, 32 by supplying zero or substantially zero current to all valves 26, 28, 30, 32 (step 102). Controller 70 then sends a command to pump 24 to raise its output pressure P to a predetermined level (step 104). In addition, controller 70 may send a command to a bypass valve (not shown) located downstream from pump 24 to raise the output pressure P from pump 24. The fluid from pump 24 is supplied at the predetermined pressure level at least to valve section 40 (i.e., the valve section that includes the valve being calibrated). In the exemplary embodiment, pump 24 supplies fluid to both valve sections 40, 42.

Controller 70 then increases a current to actuator 26*b* of head-end supply valve 26 (i.e., the actuator of the valve being calibrated), and substantially simultaneously, controller 70 also directs a full current to actuator 28*b* of head-end drain valve 28 (i.e., the actuator of the opposite valve in the same valve section as the valve being calibrated) (step 106). As a result, the full current to actuator 28*b* fully opens head-end drain valve 28. As controller 70 increases the current directed to actuator 26*b* of head-end supply valve 26, the output pressure P of pump 24 is measured by pressure sensor 36. The pressure sensor 36 transmits an output signal reflecting the measured output pressure P to controller 70 (step 108).

Controller 70 also calculates a derivative dP/dt of the measured output pressure P of pump 24 with respect to time, i.e., a rate of pressure change. The derivative dP/dt of the measured output pressure P of pump 24 is zero as controller 70 increases the current to actuator 26*b* of head-end supply valve 26 and while head-end supply valve 26 is closed. When head-end supply valve 26 opens and allows flow to pass, the output pressure P of pump 24 decreases, and the derivative dP/dt of the output pressure P of pump 24 changes rapidly. Controller 70 monitors the derivative dP/dt and determines when the derivative dP/dt is greater than a predetermined threshold and remains above the threshold for a predetermined period of time (step 110). For example, controller 70 may determine when the derivative dP/dt of the measured output pressure P of pump 24 is greater than the predetermined threshold and continues to remain over the predetermined threshold for a predetermined time interval (e.g., 0.5 second, 1 second, etc.). If the derivative dP/dt is not greater than the predetermined threshold or the derivative dP/dt does not remain greater than the predetermined threshold before the predetermined time interval has elapsed (step 110; no), then the process returns to step 106. Controller 70 then continues to increase the current to actuator 26*b* of head-end supply valve 26 and to compute the derivative dP/dt of the output pressure P of pump 24 until the derivative dP/dt is greater than the predetermined threshold for the predetermined period of time (steps 106-110).

When controller 70 determines that the derivative dP/dt is greater than the predetermined threshold for the predetermined period of time (step 110; yes), then controller 70 determines and stores the current command sent to actuator 26*b* of head-end supply valve 26 when the derivative dP/dt of output pressure P of pump 24 begins to be greater than the predetermined threshold, i.e., the start of the predetermined period of time that the derivative dP/dt continued to remain above the predetermined threshold (step 112). As shown in FIG. 5B, controller 70 then determines the number of current commands stored and determines if a predetermined number (e.g., three) of current commands have been stored (step 114). If the predetermined number of current commands have not been stored (step 114; no), then the process returns to step 102 so that controller 70 may determine and store another current command, and then determine whether the predetermined number of current commands have been stored (steps 102-114).

After the predetermined number of current commands have been stored (step 114; yes), then controller 70 calculates an average of the stored current commands, and a maximum deviation from the calculated average. The maximum deviation is the largest difference between the predetermined number of stored current commands and the calculated average. Controller 70 then determines if the maximum deviation is less than a predetermined threshold (step 116).

If the maximum deviation is less than a predetermined threshold (step 116; yes), then controller 70 computes the calibration offset current command 74 for head-end supply valve 26 by subtracting the calculated average of the stored current commands minus the expected cracking point current command (step 118). Controller 70 stores the computed calibration offset current command 74 (step 120), and then the calibration of head-end supply valve 26 is complete. The process shown in FIGS. 5A and 5B may then be repeated with controller 70 determining that head-end drain valve 28, rod-end supply valve 30, or rod-end drain valve 32 is the valve to be calibrated (step 100).

If, at step 116, the maximum deviation is not less than the predetermined threshold (step 116; no), then controller 70 determines if a predetermined maximum number of attempts (e.g., eight) to determine the cracking point current command has been reached (step 122). If the predetermined maximum number of attempts has not been reached (step 122; no), then the process returns to step 102 so that controller 70 may determine another cracking point current command by repeating steps 102 to 116, removing the oldest cracking point current command and computing another maximum deviation with the newest cracking point current command. However, if the predetermined maximum number of attempts has been reached (step 122; yes), then the calibration of head-end supply valve 26 is incomplete, and the calibration offset current command 74 may be, e.g., zero or a previously determined calibration offset current command. The process may return to step 102 at a later time to determine the cracking point current command and compute the calibration offset current command 74.

INDUSTRIAL APPLICABILITY

The disclosed calibration method may be applicable to any valve arrangement, such as an arrangement of IMVs, for controlling a fluid actuator where balancing of pressures and/or flows of fluid supplied to the actuator is desired. The disclosed calibration method may provide consistent actuator performance in a low cost simple configuration and may achieve precise positioning of valves of the valve arrangement.

The method of calibrating any of head-end and rod-end supply and drain valves 26, 28, 30, 32 includes determining the cracking point current command, i.e., the current command at which the valve being calibrated begins to allow fluid to pass. In the exemplary embodiment, calibration offset current command 74 is the cracking point current command minus the expected current command at the cracking point. Calibration offset current command 74 is added to nominal current command 72 to determine actual current command 76. Therefore, actual valve behavior may be predicted based on the cracking point current command determined using the exemplary disclosed calibration method. Actual current command 76 is transmitted from controller 70 to actuator 26*b*, 28*b*, 30*b*, 32*b* of valve 26, 28, 30, 32 to control the respective valve 26, 28, 30, 32, and is determined by summing nominal current command 72 and calibration offset current command 74.

Calibration offset current command 74 is used to shift nominal control curve 90 so that performance of valve 26, 28, 30, 32 becomes actual control curve 92. This shift compensates for variations in the actual valve behavior compared to the nominal (or desired) valve position due to, for example, variations in an individual component's design and/or assembly.

During the calibration of head-end supply valve 26, zero current is first applied to actuators 26*b*, 28*b*, 30*b*, 32*b* of valves 26, 28, 30, 32 as the pump output pressure P is raised to a predetermined level. As a result, fluid begins to flow to valves 26, 28, 30, 32. Current is applied to actuator 26*b* of head-end supply valve 26, and the current applied to actuator 26*b* is ramped up from zero while a full current at a predetermined level is applied to actuator 28*b* of head-end drain valve 28. Meanwhile, the pump output pressure P is monitored. Since the pump output pressure P is monitored during the calibration of valves 26, 28, 30, 32, calibration may be performed for each of valves 26, 28, 30, 32 with a single pressure sensor 36 disposed near the outlet of pump 24. Therefore, fewer pressure sensors may be required, thereby simplifying the valve calibration method and reducing any discrepancies that may occur when using multiple pressure sensors.

The derivative dP/dt of the pump output pressure P is calculated and compared against a predetermined threshold. If the derivative dP/dt remains greater than the predetermined threshold over a predetermined time interval, then the current command applied to actuator 26*b* at the start of the time interval is determined and stored. By applying the condition for the derivative dP/dt to be greater than the predetermined threshold for a predetermined period of time, a more accurate assessment of when valve 26, 28, 30, 32 is opening may be determined.

The calibration for a given valve 26, 28, 30, 32 may be performed multiple times, and the maximum deviation is calculated each time. When the maximum deviation is below the predetermined threshold, the calibration of the given valve 26, 28, 30, 32 is considered valid and corresponding calibration offset current command 74 is stored. As a result, pressure transients and pressure sensor noise, such as pressure spikes, may be prevented from causing an invalid calibration. Thus, pressure-based calibration may be more consistent and suitably accurate for field calibrations where conditions are not always strictly controlled.

It will be apparent to those skilled in the art that various modifications and variations can be made to the method for calibrating IMVs. Other embodiments will be apparent to those skilled in the art from consideration of the specification and practice of the disclosed method for calibrating IMVs. It is intended that the specification and examples be considered as exemplary only, with a true scope being indicated by the following claims and their equivalents.

What is claimed is:

1. A method for calibrating a valve, the valve having a valve element movable between a flow blocking position and a flow passing position, the method comprising:

pressurizing fluid directed to the valve;

increasing a current directed to the valve for controlling a position of the valve element;

sensing a pressure of the fluid;

determining if a time-derivative of the sensed fluid pressure is greater than a predetermined threshold over a predetermined period of time; and determining a cracking point current command directed to the valve, the cracking point current command being directed to the valve when the time-derivative of the sensed fluid pressure is greater than the predetermined threshold.

2. The method of claim 1, further including determining a calibration offset current command based on a difference between an expected cracking point current command and the determined cracking point current command.

3. The method of claim 2, further including determining an actual current command to direct to the valve based on the determined calibration offset current command and a nominal current command.

4. The method of claim 3, wherein the actual current command is based on a summation of the determined calibration offset current command and the nominal current command.

5. The method of claim 4, wherein the nominal current command is based on a desired position of the valve element.

6. The method of claim 1, wherein:

the fluid is pressurized at a source; and the fluid pressure is sensed at an outlet of the source.

7. The method of claim 1, wherein the determined cracking point current command is directed to the valve when the time-derivative of the sensed fluid pressure begins to be greater than the predetermined threshold.

8. The method of claim 1, wherein:

the valve is one of a first valve and a second valve;

the first valve is configured to control fluid flow to a chamber of an actuator; and the second valve is configured to control fluid flow from the chamber of the actuator.

9. The method of claim 8, wherein:

the fluid is pressurized at a source; and the fluid pressure is sensed at an outlet of the source upstream of the first and second valves.

10. The method of claim 1, further including:

determining and storing a plurality of the cracking point current commands; and determining if a maximum deviation between the cracking point current commands is below a predetermined threshold.

11. The method of claim 1, further including:

determining multiple calibration offset current commands for the same valve; and determining if a maximum deviation between the multiple calibration offset commands is below a predetermined threshold.

12. A system for calibrating a valve, the valve having a valve element movable between a flow blocking position and a flow passing position, the system comprising:

a source configured to pressurize a fluid;

a pressure sensor configured to sense a pressure of the fluid at an outlet of the source; and a controller connected to the pressure sensor, the controller being configured to:

increase a current directed to the valve for controlling a position of the valve element;

receive a sensed fluid pressure from the pressure sensor;

determine if the valve is at the flow passing position based on the measured fluid pressure at the outlet of the source; and determine a cracking point current command directed to the valve when the valve is at the flow passing position.

13. The system of claim 12, wherein the controller is further configured to determine a calibration offset current command based on a difference between an expected cracking point current command and the determined cracking point current command.

14. The system of claim 13, wherein the controller is further configured to determine an actual current command to direct to the valve based on a summation of the determined calibration offset current command and a nominal current command.

15. The system of claim 14, wherein the nominal current command is based on a desired position of the valve element.

16. A method for determining an actual current command to control a valve, the valve having a valve element movable between a flow blocking position and a flow passing position, the method comprising:

determining a nominal current command based on a desired position of the valve element;

determining a calibration offset current command based on a calibration of the valve; and determining the actual current command by summing the nominal current command and the calibration offset current command.

17. The method of claim 16, wherein the calibration offset current command is based on a difference between an expected cracking point current command and a cracking point current command determined from the calibration of the valve.

18. The method of claim 16, wherein the calibration of the valve includes:

pressurizing fluid directed to the valve at a source;

increasing a current directed to the valve for controlling a position of the valve element;

sensing a pressure of the fluid at an outlet of the source;

determining if the valve is at a flow passing position based on the sensed fluid pressure; and determining a cracking point current command directed to the valve when the valve is at the flow passing position.

19. The system of claim 12, wherein the controller is further configured to determine if a time-derivative of the sensed fluid pressure is greater than a predetermined threshold for a predetermined period of time, the determined cracking point current command being directed to the valve when the time-derivative of the sensed fluid pressure begins to be above the predetermined threshold.

20. The method of claim 16, wherein the calibration of the valve includes:

pressurizing fluid directed to the valve;

increasing a current directed to the valve for controlling a position of the valve element;

sensing a pressure of the fluid;

determining if a time-derivative of the sensed fluid pressure is greater than a predetermined threshold over a predetermined period of time; and determining a cracking point current command directed to the valve, the cracking point current command being directed to the valve when the time-derivative of the sensed fluid pressure begins to be greater than the predetermined threshold.

21. The method of claim 16, wherein the nominal current command is associated with a nominal control curve, and the determining of the actual current command includes shifting the nominal control curve based on the calibration offset current command.

22. The method of claim 21, further including determining an actual control curve based on the shifting of the nominal control curve.

23. The method of claim 16, further including determining an actual control curve associated with the actual current command.

24. The method of claim 23, wherein the actual control curve is based on a nominal control curve and the calibration offset current command, and the nominal control curve is associated with the nominal current command.

* * * * *